(12) United States Patent
Lew et al.

(10) Patent No.: US 6,385,567 B1
(45) Date of Patent: *May 7, 2002

(54) PROGRAM-MODULE SUBSTITUTION IN A PROGRAM LOADER FOR MULTIPLE-PLATFORM EMULATION

(75) Inventors: Jonathan C. Lew, Redmond; Ori Gershony, Seattle; David E. Hastings, Carnation, all of WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/904,057

(22) Filed: Jul. 31, 1997

(51) Int. Cl.[7] ................................. G06F 9/455
(52) U.S. Cl. ................. 703/27; 703/26; 717/5; 717/11
(58) Field of Search .................. 395/685, 651, 395/706, 707, 709; 703/26, 27; 717/5, 6, 7, 8, 9, 11

(56) References Cited

U.S. PATENT DOCUMENTS 5,247,681 A * 9/1993 Janis et al. .................. 395/700
5,708,811 A * 1/1998 Arendt et al. ............... 395/712
5,842,017 A * 11/1998 Hookway et al. ............ 395/707
5,930,509 A * 7/1999 Yates et al. .................. 395/707

OTHER PUBLICATIONS

Pietrek, "Windows 95 System Programming Secrets", ISBN 1–56884–318–6, pp. 685–703, Nov. 1995.*
Hookway, "Digital FX!32 Running 32–Bit x86 Applications on Alpha NT", paper appearing in Compcon '97 Proceedings of the IEEE, pp. 37–42, Feb. 1997.*
Selzter, "Four Ways to Fake an X86", PC Week, Nov. 21, 1994, pp. 93–95.*
Change Log file for the Wine Project, http://www.winehq.com/source/documentation/ChangeLog.OLD.*
"IS embraces NT 4.0 beta sight unseen", InfoWorld, vol. 18 Issue 4, pp. 1 and 20, Jan. 1996.*
"NT 4.0 looks good in beta version", Computerworld, vol. 30 Issue 11, pp. 45 and 52, Mar. 1996.*
Thompson, "An Alpha in PC Clothing", Byte Magazine, pp. 195–196, Feb. 1996.*

* cited by examiner

Primary Examiner—Eric W. Stamber
Assistant Examiner—Samuel Broda
(74) Attorney, Agent, or Firm—Lee & Hayes, PLLC

(57) ABSTRACT

A single program loader loads program modules for multiple platforms in an emulation environment. A name list has entries each containing the name of a module for one platform and the name of a corresponding module for another platform. The loader identifies first-platform modules in a load list, and substitutes the corresponding module for the other platform. Modules referenced in any loaded module are added to the load list recursively.

22 Claims, 3 Drawing Sheets

PROGRAM-MODULE SUBSTITUTION IN A PROGRAM LOADER FOR MULTIPLE-PLATFORM EMULATION

FIELD OF THE INVENTION

The present invention relates to electronic data processing, and more specifically concerns the loading of software modules for programs written for different processing platforms.

BACKGROUND OF THE INVENTION

Frequently, a computer application program written for one digital processor, operating system, or other platform must be executed on another platform. This requires translation of the program's instruction codes, data formats, application-program interfaces (APIs), and possibly other characteristics as well. A conventional program variously known as an emulator, simulator, translator, or interpreter translates the necessary application-program characteristics after the operating system loads the application.

Furthermore, few present programs are standalone entities. An application program almost always performs low-level functions by calling program code located in separate modules, sometimes known as dynamic link libraries (DLLs). These modules in turn may call other modules for performing lower-level functions. Because many application programs may require the same low-level functions, DLLs and similar modules are often shared among a group of applications. Applications and modules specify the modules they require in internally accessible load lists.

The growing use of emulators and other multiplatform environments results in related groups of modules, such as a first group for the platform being emulated, and a second group for the native platform upon which the emulation occurs. When an operating-system loader loads an application written for the first (emulated) platform, it must sometimes load modules for the second (native) platform rather than the first-platform modules specified in the application's load list.

Some multiple-platform systems have employed multiple loaders, one for the emulated platform and another for the native platform. Each loader recognizes only the module names in its own group, to avoid conflicts. However, this approach is error-prone. First, the semantics of the two loaders may differ. Secondly, DLL modules have a reference count indicating when they can be unloaded from memory; keeping these counts synchronized between two or more loaders ranges from very difficult to impossible.

In addition, multiplatform programs may employ a second type of DLL module, sometimes called a "thank module." Thank modules come in pairs (or triples, etc.); one module of the pair implements a set of APIs for the first platform, while the second implements corresponding APIs for the second platform. An application-program version written for one platform loads the first module of the pair, while the version for the other platform must load the second module of the same pair. In the past, special handling has been required to load the proper one of the think modules for the application version being processed.

SUMMARY OF THE INVENTION

A software-module loader loads modules specified by an application program which are written for different platforms. The loader uses a name list having entries each containing the name of a module for one platform and the name of a corresponding module for another platform. As the loader sequences through a load list of modules, it checks the name of each module against the name list. If the name list specifies a corresponding second-platform module, then the loader loads that module instead of the one in the load list. In this way, the same loader handles modules from both platforms, and avoids requiring coordination with a separate loader for each platform. The loader keeps a reference count of loaded modules. If the same module is again encountered in the load list, its count is merely increased, instead of loading it again. Because only one reference count is used for modules of all platforms, the loader avoids system crashes which may occur when multiple counts might unload a module before all programs which use it have completed execution.

The loader may also handle a special type of translation or "think" module by recognizing the special type and bypassing a test which would otherwise prevent it from loading. This permits modules of different types to be loaded by the same loader, again simplifying reference counting.

Other features and advantages, as well as modifications within the spirit of the invention, will appear to those skilled in the art from the following detailed description.

DETAILED DESCRIPTION OF PREFERRED EMBODIMENT

Figure 1:
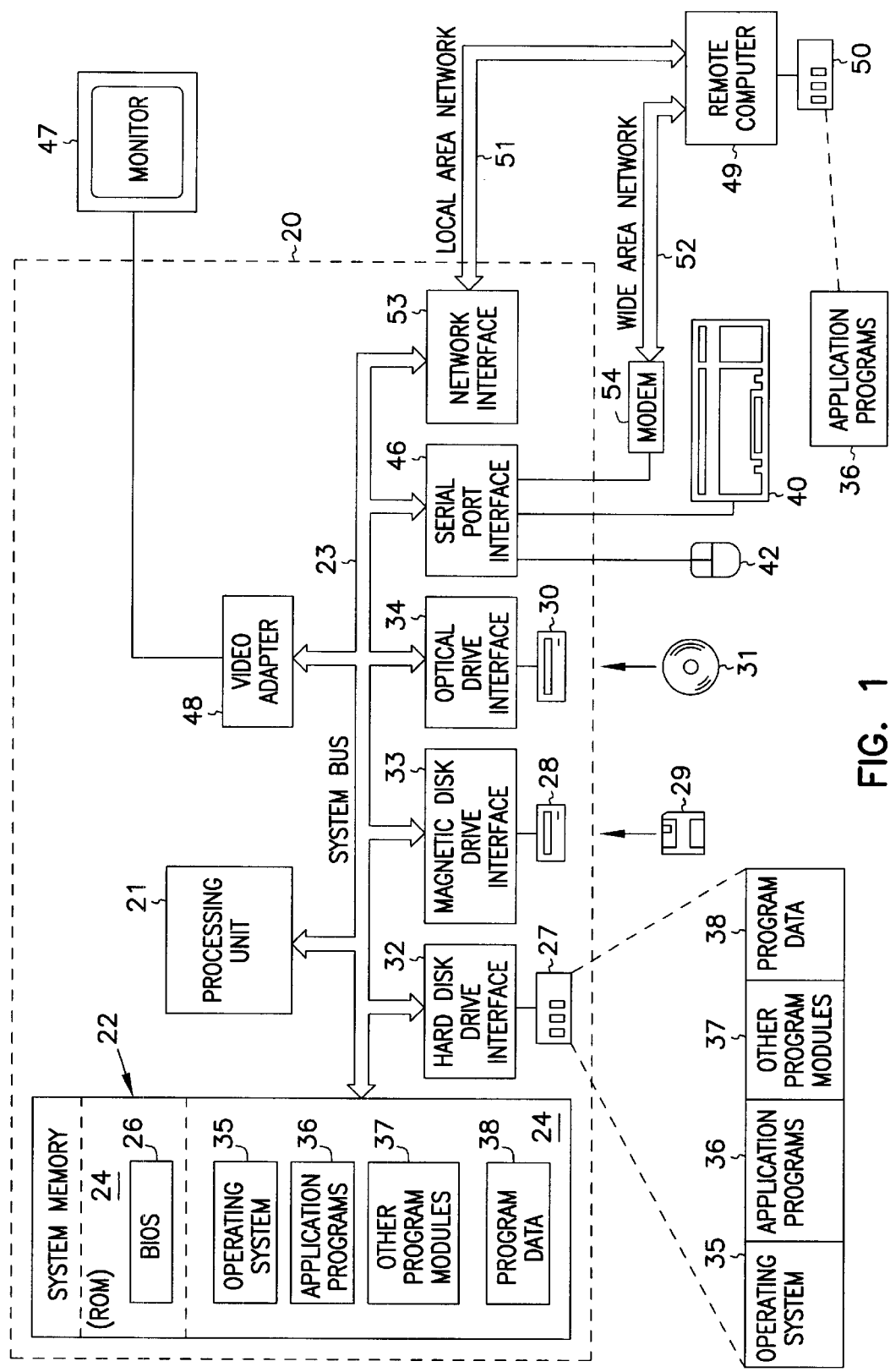
FIG. 1 is a block diagram of an illustrative computer system which may host the present invention.

FIG. 1 provides a brief, general description of a suitable computing system in which the invention may be implemented. The invention, comprising a single software module loader for multiple environment capable of running programs written for multiple platforms will then be described with reference to FIGS. 2 and 3. The invention will hereinafter be described in the general context of computer executable instructions such as program modules, executed by a personal computer (PC); however, other environments are possible. Program modules include routines, programs, objects, components, data structures, etc. that perform particular tasks or implement particular abstract data types. Those skilled in the art will appreciate that the invention may be practiced with other computer-system configurations, including hand-held devices, multiprocessor systems, microprocessor-based programmable consumer electronics, network PCs, minicomputers, mainframe computers, and the like. The invention may also be practiced in distributed computing environments where tasks are performed by remote processing devices linked through a communications network. In a distributed computing environment, program modules may be located in both local and remote memory storage devices.

FIG. 1 shows an exemplary system for implementing the invention. It employs a general-purpose computing device in the form of a conventional personal computer 20, which includes processing unit 21, system memory 22, and system bus 23 that couples the system memory and other system components to processing unit 21. System bus 23 may be any of several types, including a memory bus or memory controller, a peripheral bus, and a local bus, and may use any of a variety of bus structures. System memory 22 includes read-only memory (ROM) 24 and random-access memory (RAM) 25. A basic input/output system (BIOS) 26, stored in ROM 24, contains the basic routines that transfer information between components of personal computer 20. BIOS 24 also contains start-up routines for the system. Personal computer 20 further includes hard disk drive 27 for reading from and writing to a hard disk (not shown), magnetic disk drive 28 for reading from and writing to a removable magnetic disk 29, and optical disk drive 30 for reading from and writing to a removable optical disk 31 such as a CD-ROM or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. Such media may include magnetic cassettes, flash-memory cards, digital versatile disks, Bernoulli cartridges, RAMs, ROMs, and the like.

Program modules may be stored on the hard disk, magnetic disk 29, optical disk 31, ROM 24 and RAM 25. Program modules may include operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial-port interface 46 coupled to system bus 23; but they may be connected through other interfaces not shown in FIG. 1, such as a parallel port, a game port, or a universal serial bus (USB). A monitor 47 or other display device also connects to system bus 23 via an interface such as a video adapter 48. In addition to the monitor, personal computers typically include other peripheral output devices (not shown) such as speakers and printers Personal computer 20 may operate in a networked environment using logical connections to one or more remote computers such as remote computer 49. Remote computer 49 may be another personal computer, a server, a router, a network PC, a peer device, or other common network node. It typically includes many or all of the components described above in connection with personal computer 20; however, only a storage device 50 is illustrated in FIG. 1. The logical connections depicted in FIG. 1 include local-area network (LAN) 51 and a wide-area network (WAN) 52. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20, and connects to system bus 23 via serial-port interface 46. In a networked environment, program modules depicted as residing within 20 or portions thereof may be stored in remote storage device 50. Of course, the network connections shown are illustrative, and other means of establishing a communications link between the computers may be substituted. For example, network adapter 53 and/or modem 54 may use wireless signals, and PC 20 may directly execute applications 36 stored on remote computer 49.

Figure 2:
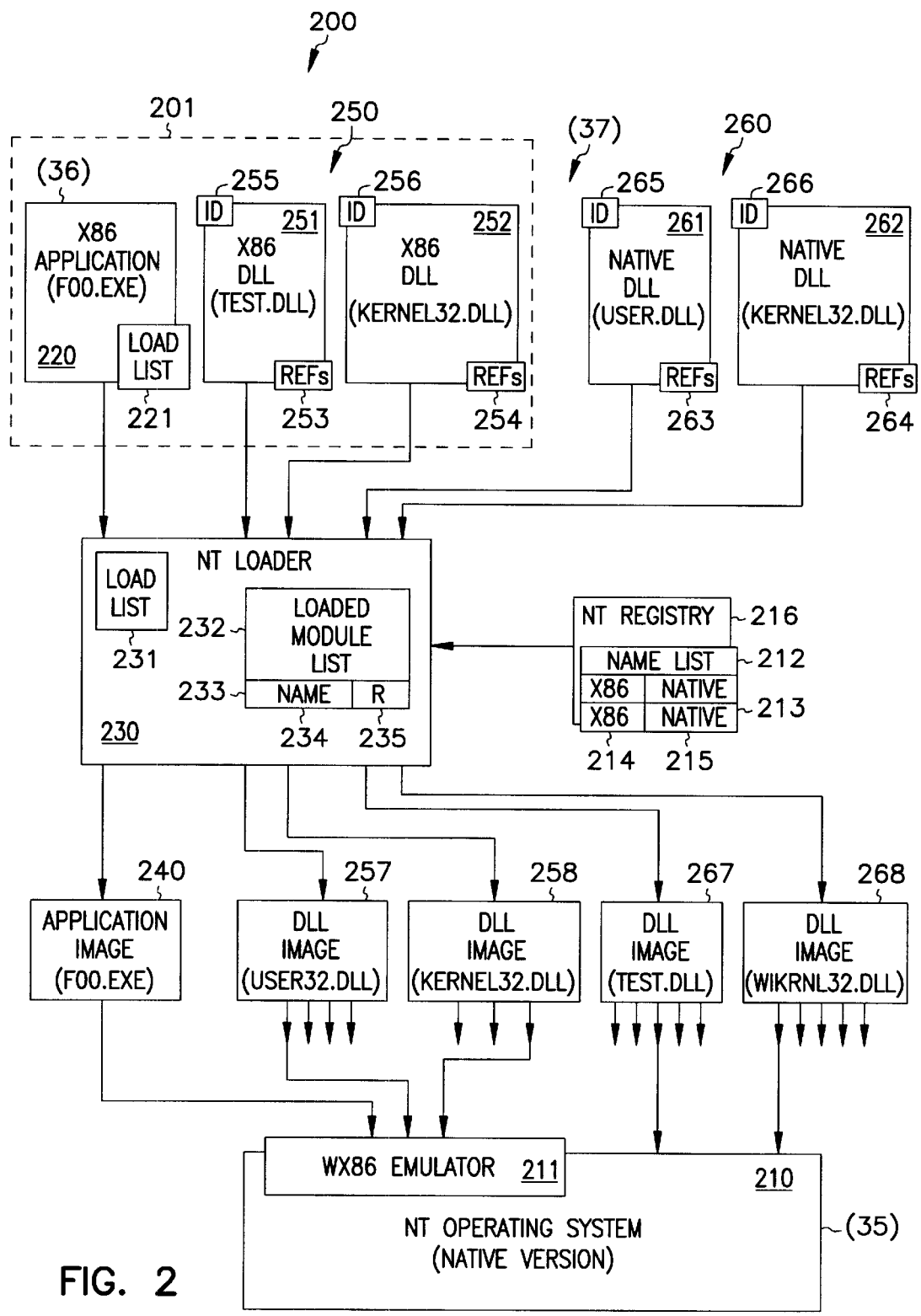
FIG. 2 is a block diagram of a virtual-machine environment in which the present invention finds utility.

FIG. 2 is a block diagram of the software elements 200 which are used in one embodiment of the invention. The elements enclosed in dashed line 201 are elements designed to be executed on a first platform such as a processor 21, FIG. 1, of the Intel "X86" family—for example a conventional Intel 80386, 80486, or Pentium microprocessor. The other elements execute upon a second platform, such as a Digital Equipment Corp. "Alpha" or an IBM PowerPC serving as processor 21. This description refers to the first and second platforms as the "X86" and "native" platforms, respectively. For purposes of illustration, a native-platform version 210 of the Microsoft NT operating system serves as OS 35 in FIGS. 1 and 2. A conventional emulator program 211 translates the instructions and data of an X86-platform application program such as 36, FIGS. 1 and 2, from those of the X86 platforms to equivalent operations in the native platform. Elements 200 comprise computer-executable instructions and data organized in various structures; some or all of them may find physical form as indicia recorded on a storage medium such as the hard drive 27, diskette 28, or optical disc 31 shown in FIG. 1

When OS 35 executes an X86 application 36 such as POO.EXE 220, a conventional loader 230 loads a copy of the application from a source location such as disk drive 27 to build an application image 240 in a destination location such as RAM 22. A load list 221 associated with the application contains the names of external modules 37 which must also be loaded in order to execute the application. Some of the modules, such as those indicated generally at 250 in FIG. 2, have format, instructions, and interfaces appropriate for the X86 platform being emulated. Others, indicated at 260, have a native-platform configuration, and can be executed directly. Modules indicated generally at 250 and 260 are typically dynamic link libraries (DLLs) containing routines for common functions within application 220, but they may be other conventional modules as well.

Just as application 220 calls modules 250, 260 during its execution, the individual modules themselves may call other modules for performing subfunctions common across a number of modules. Therefore, some or all of the individual modules 251, 252, 261, 262 may incorporate their own load lists 253, 254, 263, 264, which contain names of the modules which Trust be loaded for their execution. Each individual module also carries a respective identification 255, 256, 265, 266 designating it as either an X86-platform or a native-platform module, and as one of two different types, if it is an X86 module. In addition, other application programs (not shown) may have been previously loaded and not yet unloaded;

Loader 230 produces RAM images 257, 268, 267, 258 of each of the modules 251, 252, 261, 262 named in application load list 221. Some of these, such as indicated at 257, 258, are "WI" DLLs which are written for the emulated platform, are actually executed by the WX86 emulator 211. Others, such as 267, 268, are "WH" DLLs written in native code for direct execution by OS 210. Rather than working directly with load list 221, loader 230 makes a copy 231, which may be modified and expanded as explained below; the term "load list" will therefore refer to copy 231, unless otherwise indicated.

As loader 230 loads each of the modules in list 231, it keeps a loaded-module list 232 of the modules already loaded. Each entry 233 contains the module name 234 and a reference count 235. Because many modules in a currently-executing process may call the same module, a module need not be loaded again if it has previously been loaded by another module in the same process. But, as a consequence, a module image cannot necessarily be unloaded when its calling module terminates; as mentioned above, another module in the process may also require this module. Therefore, loaded-module list 231 contains the name of every currently loaded module. Whenever an application 210 or a module 250, 260 requests an already loaded module, the reference count 235 for that module name 234 increments. When the calling module releases the called modules, loader 230 does not unload the called module image until its reference count 235 has reached zero, indicating that no currently running module is still using it.

Loader 230 intercepts calls from an X86-platform application such as 220 to an X86-platform version of KERNEL32.DLL. Because the application is actually executing on a second (RISC) platform, KERNEL32.DLL does not exist. In order to allow the application to execute on this platform, loader 230 inserts a WX86 "think" DLL pair between X86-platform application 220 and the corresponding native-platform DLL 262. The pair of DLLs 258 and 267 (named WIKRNL32.DLL and WHRNL32.DLL) resolve this incompatibility.

Module-name list 212 has a sequence of entries as indicated at 213. Each entry contains the name 214 of a known X86-platform module and a corresponding native-platform name 215. The latter names are unique among the set of modules used with the native platform. In the present environment, the Microsoft NT OS 210 already maintains a built-in database 216 called a "registry," in which other programs may store and access lists in the form of entries each having a key and a value for that key; accordingly, module-name list 212 is actually a set of keys representing X86 module names and values representing the corresponding native names.

Figure 3:
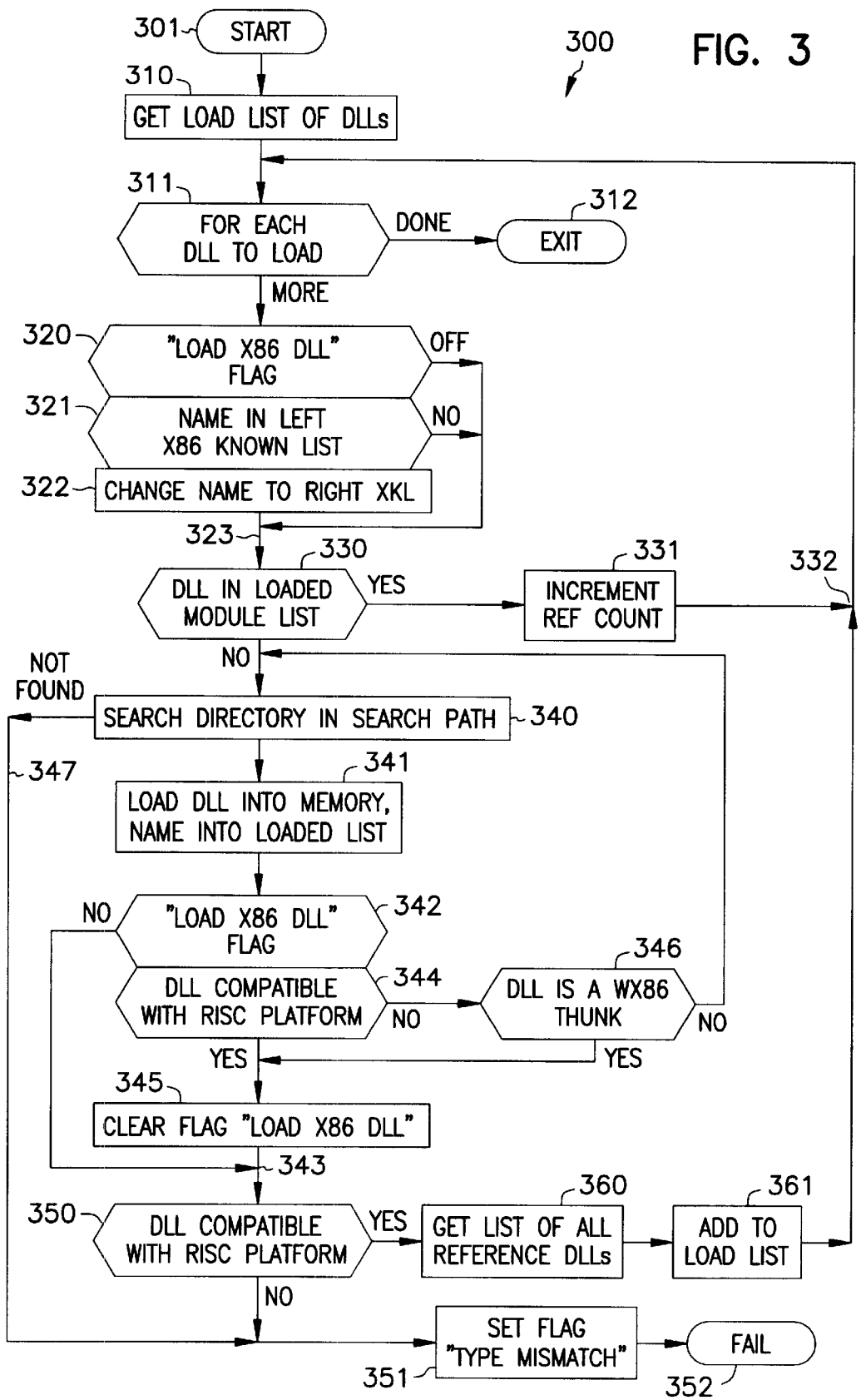
FIG. 3 is a flow diagram showing the operation of a program loader incorporating the invention.

FIG. 3 shows a computer-implemented method 300 for implementing an embodiment of the invention, using the elements of FIG. 2. After starting to load application program 220 at block 301, loader 230 accesses load list 231 at block 310. Block 311 sequentially steps through the load list, selecting a current module (DLL) 250, 260 to load. Block 312 exits routine 300 when all modules in list 231 have been loaded.

Block 320 determines that the current module is an X86-platform module 250 from a flag or other designation in an identification area such as 255 in module 251, FIG. 2. Block 321 finds the name of this module in name list 212 as one of the known X86 module names 214. Block 322 substitutes the name of the corresponding native-module name 215, from the same entry 213, into load list 231. The original module's status as an X86 module is presented to block 320 as a "Load X86 DLL" flag. If the flag is off, or if the X86 name is not found in name list 212, control passes directly to point 323.

The current-module name is placed into slot 234 of entry 233 in loaded-module list 232, and its reference count is set to "1", in block 330. However, if block 330 determines that this module has already been loaded, block 331 merely increments its reference count and returns control to point 332 begin loading the next module.

Block 340 begins the loading of the current module by searching a predetermined conventional directory path to find the location of the module having that name. An image of the first module found having the proper name is loaded into RAM 22 by block 341. If block 342 determines that the current module is not an X86-platform module, the module loading is complete; and control passes to point 343. Otherwise, block 344 asks whether the current module is compatible with the RISC platform. If so, block 345 clears the "Load X86 DLL" flag and passes to 343. If the current module is a normal (non-think) module, block 344 returns control to block 340 to continue searching for another module of the same name. This step hides native-platform modules, in case the search path contains two modules having the same name, and block 340 encounters the native-platform module before it reaches the X86-platform module of the same name. Traversing the entire search path without finding a valid name for the module causes block 340 to fail at exit 347.

In addition, multiplatform programs may employ a second type of DLL module, sometimes called a "think module." Think modules come in pairs; one module of the pair implements a set of APIs for the X86 platform, while the second implements corresponding APIs for the native platform. An application-program version written for one platform loads the first module of the pair, while the version for the other platform must load the other module of the same pair. Because name list 212 can represent these pairs as entries, no compatibility issue can arise. Therefore, if the current module is a "thunk" DLL, block 346 negates the effect of block 344 and passes control to block 345 Block 350 determines whether the current module is compatible with the target native platform. If it is not, block 351 sets a "type mismatch" flag, and fails the entire load at exit 352. This action also occurs when exit 347 signals that the search could not find a module having the correct name.

If the current module loads successfully, block 360 accesses the list of names (shown as lists 253, 254, 263, 264 in FIG. 2) required by the current module. Block 361 adds these names to load list 231, FIG. 2, and returns control to block 311. In this way, block 311 will sooner or later select all modules referenced by other modules as the current module, and load them. Again, if any of these modules have already been loaded from another source, blocks 330 and 331 will not load them again, but will ensure that they are not unloaded as long as any module that references them remains loaded in RAM 22, FIG. 1.

The following example demonstrates how method 300 enables the WX86 emulator 211 to inject its modules between the X86-platform modules and the native-platform API DLL modules. Suppose that load list 221 of application 220 includes an X86-platform module 251 named TEST.DLL, and that TEST.DLL has a link to KERNEL32.DLL module 252. This module is also an X86-platform module, but it has the same name as a native-platform module 262. In the following sequence of events, the parenthesized numbers refer to blocks in FIG. 3.

| | | |
|---|---|---|
| (320) | "Loading X86 DLL" flag is set, but (321) TEST.DLL is not in "Known X86 DLLs" list | |
| (330) | TEST.DLL is not in the loaded-module List | |
| (340) | TEST.DLL is found along the search path, and (341) loaded into memory <u>and loaded list</u> | |
| | (342) "Loading X86 DLL" flag is set | |
| | (344) TEST.DLL is for X86 platform | |
| | <u>(345) Clear the "Loading X86 DLL" flag</u> | |
| <u>(350)</u> | <u>TEST.DLL is for RISC platforms</u> | |
| (360) | TEST.DLL is linked to KERNEL32.DLL. (361) Recursively load KERNEL32.DLL: | |
| | <u>(311) There is another DLL to load</u> | |
| | (320) "Loading X86 DLL" flag is set, and (321) KERNEL32.DLL is in the "Known X86 DLLs" list | |
| | (322) Alter the name of the DLL to be loaded to WIKRNL32.DLL | |
| | (330) WIKRNL32.DLL is not in the loaded-module list | |
| | (340) WIKRNL32.DLL is found along the search path, and (341) loaded into memory <u>and loaded list</u> | |
| | (342) "Loading X86 DLL" flag is set | |
| | (344) WIKRNL32.DLL is for X86 platform | |
| | <u>(345) Clear the "Loading X86 DLL" flag</u> | |
| | <u>(350) WIKRNL32.DLL is for RISC platforms</u> | |
| | (360) WIKRNL32.DLL is linked to WHKRNL32.DLL. (361) Recursively load WHKRNL32.DLL: | |
| | <u>(311) There is another DLL to load</u> | |
| | (320) "Loading X86 DLL flag" is set, but (321) WHKRNL32.DLL is not in the "Known X86 DLLs" list | |
| | (330) WHKRNL32.DLL is not in the loaded-module list | |
| | (340) WHKRNL32.DLL is found along the search path, and (341) loaded into memory <u>and loaded list</u> | |
| | (342) "Loading X86 DLL" flag is set | |
| | (344) WHKRNL32.DLL is for RISC platforms | |
| | (346) WHKRNL32.DLL is a WX86 thunk DLL, so do not fail the load | |
| | (345) Clear the "Loading X86 DLL" flag | |
| | <u>(350) WHKRNL32.DLL is for RISC platforms</u> | |
| | (360) WHKRNL32.DLL is linked to KERNEL32.DLL. (361) Recursively load KERNEL32.DLL: | |
| | <u>(311) There is another DLL to load</u> | |
| | (320) "Loading X86 DLL" flag is clear; don't check the "Known X86 DLLs" list | |
| | (330) KERNEL32.DLL is not in the loaded-module list | |
| | (340) KERNEL32.DLL is found along the search path, and (341) loaded into memory <u>and loaded list</u> | |
| | (342) "Loading X86 DLL" flag is clear | |
| | (350) KERNEL32.DLL is for RISC platforms | |
| | (360) KERNEL32.DLL imports nothing, <u>so (361) nothing is added to load list</u> | |
| | (311) Load of KERNEL32.DLL is complete | |
| | (311) Load of WHKRNL32.DLL is complete | |
| | (311) Load of WIKRNL32.DLL is complete | |
| (311) | Load of TEST.DLL is complete | |

At the completion of this example procedure, module TEST.DLL is loaded and linked to WIKRNL32.DLL, which is linked to WHKRNL32.DLL, which in turn is linked to KERNEL32.DLL. Calls from TEST.DLL to KERNEL32.DLL will be intercepted by the WX86 emulator's WIKRNL32.DLL/WHKRNL32.DLL module pair for thinking—that is, for translation of the underlying X86-platform API into the corresponding native-platform API.

It is to be understood that the above description is intended to be illustrative, and not restrictive. While the invention has been described with respect to the NT operating system, it is equally applicable to other operating systems and environments. The various load lists that have been described may be implemented in many different ways as will be apparent to a skilled programmer. It should also be noted that the distribution of function between software, firmware and hardware may be modified as desired by the designer without departing from the spirit and scope of the invention. Many other embodiments will be apparent to those skilled in the art upon reviewing the above description. The scope of the invention should, therefore, be determined with reference to the appended claims, along with the full scope of equivalents to which such claims are entitled.

What is claimed is:

1. In a programmable digital computer having an emulator for executing an application program written for a first platform on a different second platform, a method for loading software modules external to and callable from within the application program, comprising the steps of:

before execution of the application program, reading a load list associated with the application program containing the names of modules called from within the application program;

accessing a name list separate from the load list having multiple entries for modules shared among a group of application programs, each entry containing a name of a first-platform module and a corresponding name of a second-platform module;

for each module in the load list, selecting an entire one of the modules associated with the application program as a current module;

determining that the current module is written for the first platform;

finding an entry in the name list containing the name of the current module as the name of a first-platform module;

loading the module having the corresponding name for the second platform.

2. The method according to claim 1, and further comprising:
   determining that a particular one of the modules has already been loaded;
   blocking the loading of the particular module; and
   incrementing a single reference count for that module.

3. The method according to claim 2, wherein the reference count is incremented in a single list containing reference counts for all modules of all platforms.

4. The method according to claim 1, and further comprising:
   determining that the current module references additional ones of the modules; and
   repeating the above steps for the names of the additional modules.

5. A method according to claim 1, and further comprising:
   determining that the current module is incompatible with at least one of the first and second platforms;
   raising an error condition; and
   blocking the loading of the current module in response to the error condition.

6. A method according to claim 5 wherein the current module is incompatible with the first platform.

7. A method according to claim 6 wherein those modules written for the first platform have multiple different types, further comprising:
   detaining that the current module has a particular one of the different types; and
   blocking the error condition.

8. A method according to claim 1 wherein the loading step comprises:
   searching a path for the corresponding name for the second platform;
   finding a candidate module having the corresponding name;
   determining that the candidate module is incompatible with at least one of the first and second platforms; and
   continuing to search the path for another candidate module.

9. A method according to claim 8, and further comprising the steps of:
   completing the search path without finding a candidate module; and raising an error condition.

10. A storage medium having instructions stored thereon for causing a suitably configured computer to load software modules associated with an application program written for a first platform, wherein the computer has an emulator running on a second platform, the computer program having instructions and data for causing the computer to perform the steps comprising:
    before execution of the application program, accessing a load list associated with the application program containing the names of modules called from within the application program;
    accessing a name list separate from the load list having multiple entries for modules shared among a group of application programs, each entry containing a name of a first-platform module and a corresponding name of a second-platform module;
    for each module in the load list, selecting an entire one of the modules associated with the application program as a current module;
    determining that the current module is written for the first platform;
    finding an entry in the name list containing the name of the current module as the name of a first-platform module;
    loading the module having the corresponding name for the second platform.

11. A programmable digital computer comprising:
    a processor;
    an emulator for translating instructions executable on a first platform to instructions executable on the processor;
    a plurality of application programs containing load lists specifying external modules called from within the programs, at least one of the programs containing instructions for the first platform;
    a plurality of modules shared among the application programs, some of the modules being executable on a first platform and others on the processor;
    a single name list having entries each specifying a first module executable on the first platform and a corresponding second module executable on the processor;
    an operating system having a loader for loading one of the application programs and reading its load list, determining whether each of the modules named in the load list of the one application program are executable on the first processor, and, for each such module, reading the name list and loading the second module in place of the corresponding first module.

12. The computer of claim 11 further comprising a loaded module list containing the names of modules loaded by the loader and a reference count for inhibiting the loader from loading again a module that had already been loaded.

13. The computer of claim 11 where the loader increments the reference count of a module that has already been loaded.

14. The computer of claim 11 where the loader loads a module that has not already been loaded and sets the reference count for that module.

15. The computer of claim 11 where at least some of the modules themselves include load lists specifying additional modules to be loaded.

16. The computer of claim 11 where the loader transfers control to the one application program after loading each of the modules in the load list of the one application program.

17. The computer of claim 11 where the loader determines that one of the modules is incompatible with one of the platforms, but that it has a particular one of a plurality of different types, and loads it despite the incompatibility.

18. In a programmable digital computer having an emulator for executing an application program written for a first platform on a different second platform, a method for loading software modules external to and callable from within the application program, comprising the steps of:
    reading a load list associated with the application program containing the names of modules called from within the application program;
    accessing a name list separate from the load list having multiple entries for modules shared among a group of application programs, each entry containing a name of a first-platform module and a corresponding name of a second-platform module;
    for each module in the load list, selecting one of the modules associated with the application program as a current module;

determining that the current module is written for the first platform;

finding an entry in the name list containing the name of the current module as the name of a first-platform module;

selecting from the name list a second-platform module corresponding to the current module;

determining whether the second-platform module has been previously loaded;

if not, loading the corresponding second-platform module;

if so, inhibiting the loading of the corresponding second-platform module and incrementing a single reference count associated with the module.

19. The method according to claim 18, and further comprising changing the name in the load list of the current module to the name of the corresponding second-platform module in that name-list entry.

20. The method of claim 18, further including, if the module has not been previously loaded, setting the single reference count associated with the module.

21. The method of claim 18, further comprising:

determining that the current module has an incompatibility with one of the platforms;

determining that the current modules has a particular one of a plurality of different types;

loading the current module despite the determined incompatibility.

22. A storage medium for holding representations of instructions and data for causing a suitably programmed digital computer to perform the method of claim 18.

* * * * *

UNITED STATES PATENT AND TRADEMARK OFFICE
CERTIFICATE OF CORRECTION

PATENT NO. : 6,385,567 B1
DATED : May 7, 2002
INVENTOR(S) : Lew et al.

It is certified that error appears in the above-identified patent and that said Letters Patent is hereby corrected as shown below:

Column 1,
Line 52, replace ""thank" with -- "thunk --.
Line 53, replace "Thank" with -- Thunk --.
Line 60, replace "think" with -- thunk --.

Column 2,
Line 17, replace ""think"" with -- "thunk" --.

Column 4,
Line 28, replace "POO.EXE" with -- FOO.EXE --.
Line 48, replace "Trust" with -- must --.

Column 5,
Line 21, replace ""think"" with -- "thunk" --.
Line 25, replace "WHRNL32.DLL)" with -- WHKRNL32.DLL) --.

Column 6,
Line 13, replace "(non-think)" with -- (non-thunk) --.
Line 25, replace ""think" with -- "thunk --.
Line 26, replace "Think" with -- Thunk --.

Column 7,
Line 50, replace "thinking" with -- thunking --.

Column 8,
Line 50, delete "before execution of the application program,"

Column 9,
Line 31, replace "detaining" with -- determining --.

UNITED STATES PATENT AND TRADEMARK OFFICE
CERTIFICATE OF CORRECTION

PATENT NO. : 6,385,567 B1
DATED : May 7, 2002
INVENTOR(S) : Lew et al.

It is certified that error appears in the above-identified patent and that said Letters Patent is hereby corrected as shown below:

<u>Column 10,</u>
Lines 10-13, delete "a processor; an emulator for translating instructions executable on a first platform to instructions executable on the processor;".

Signed and Sealed this

Fifteenth Day of July, 2003

JAMES E. ROGAN
*Director of the United States Patent and Trademark Office*